Figure 1:
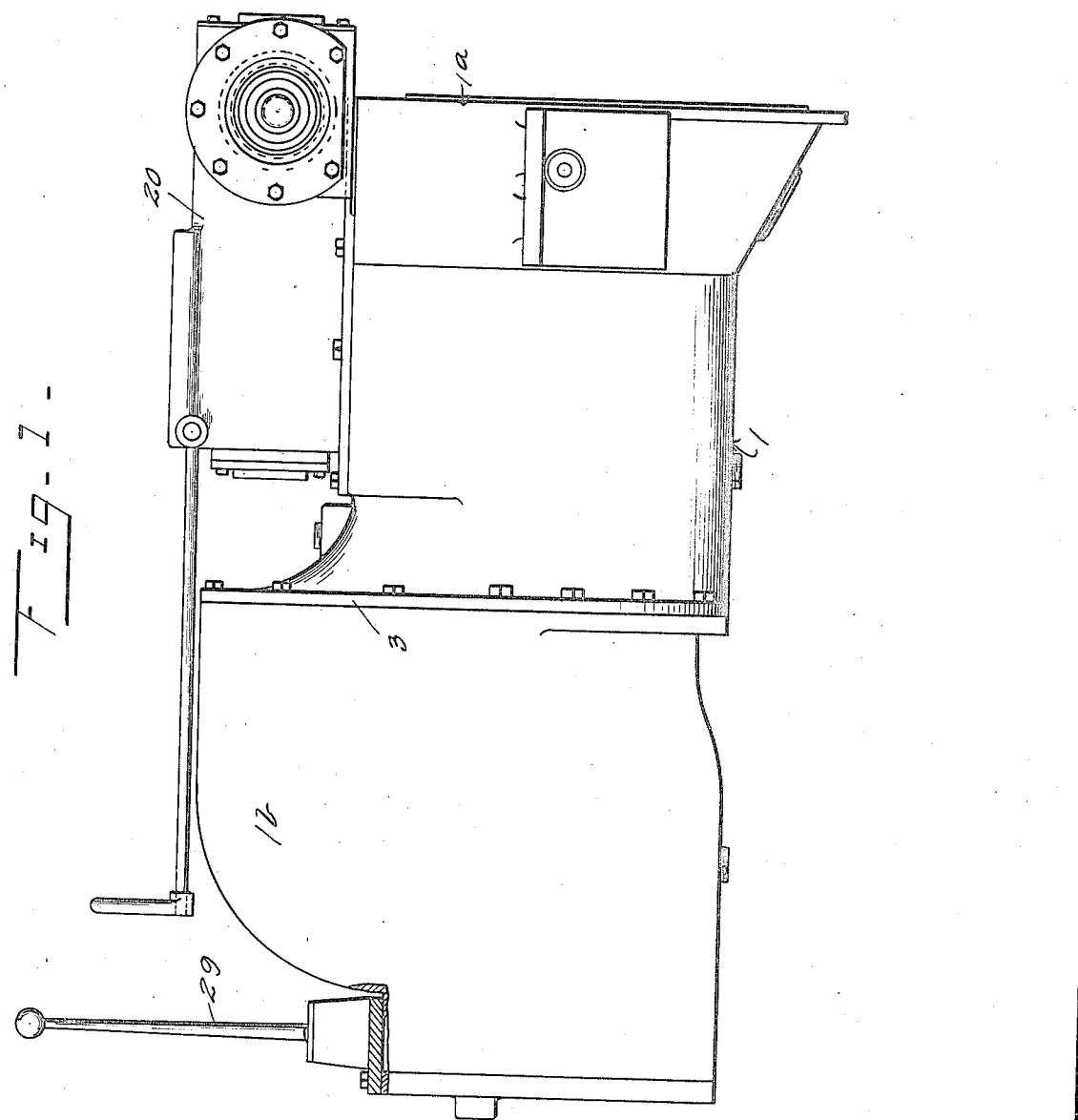

Inventors,
B.C.Zuhars
H.D.Clarke

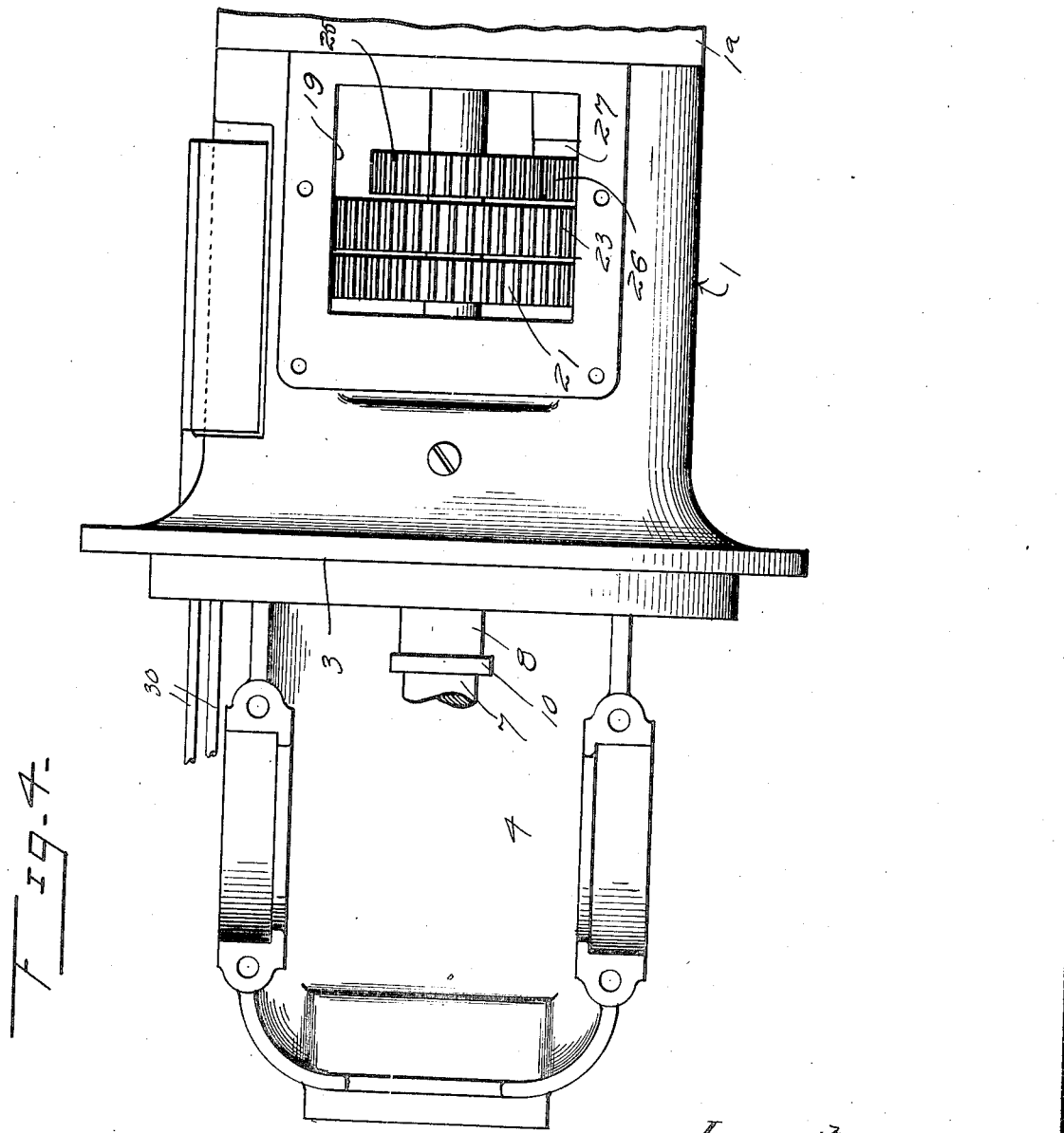

Patented Mar. 27, 1923.

1,449,482

UNITED STATES PATENT OFFICE.

BENJAMIN C. ZUHARS, OF COLUMBUS, OHIO, AND HARRY D. CLARKE, OF LOS ANGELES, CALIFORNIA, ASSIGNORS TO THE OHIO TRACTOR COMPANY, OF COLUMBUS, OHIO, A CORPORATION OF OHIO.

TRANSMISSION.

Application filed February 6, 1920, Serial No. 356,749. Renewed June 14, 1922. Serial No. 568,311.

*To all whom it may concern:*

Be it known that we, BENJAMIN C. ZUHARS and HARRY D. CLARKE, citizens of the United States, residing at Grand View Heights, Columbus, in the county of Franklin and State of Ohio, and Los Angeles, California, respectively, have invented certain new and useful Improvements in Transmissions; and they do hereby declare the following to be a full, clear, and exact description of the invention, such as will enable others skilled in the art to which it appertains to make and use the same.

This invention relates to new and useful improvements in transmission especially adaptable for tractors and like heavy motor vehicles and designed principally for use in connection with a double reduction drive for a motor vehicle of the type described, illustrated and claimed in application for U. S. Letters Patent filed March 14th, 1919 and serially numbered 282,655 and has for its primary object the provision of means whereby the power may be delivered in direct alinement with the worm shaft of the differential, thus giving the tractor or like motor vehicle greater draft power over other known types and with a reduced amount of friction and back pressure.

Another object of this invention is the provision of an idle gear on the counter shaft of the transmision that is continuously driven by one of the shifting gears and is adapted to drive a power take-off which forms the subject matter of a co-pending application and which is adapted to operate other machinery so that all gears are confined in the transmission housing and protected thereby and also lubricated from the same source that lubricates the transmission.

A further object of this invention is the provision of means whereby the counter shaft is only rotated during the movement of the tractor or vehicle so as to obviate as far as possible shifting a stationary gear into a spinning gear which increases the life of the gears and also does away with the rotation of the counter shaft when operating the power take-off shaft which reduces the friction between the idle gear and said counter shaft.

A still further object of this invention is the provision of a transmission of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

Figure 2:
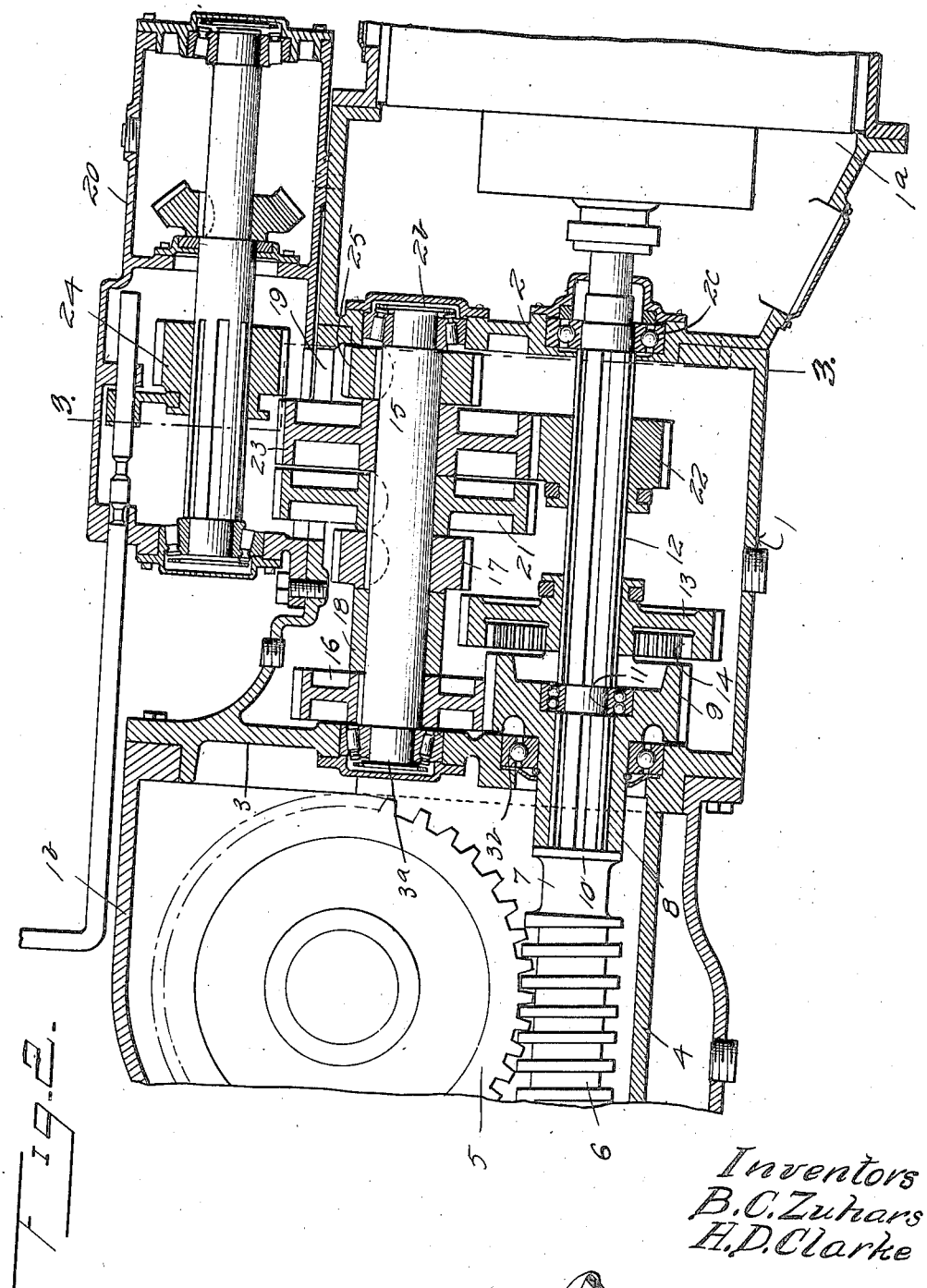
Figure 3:
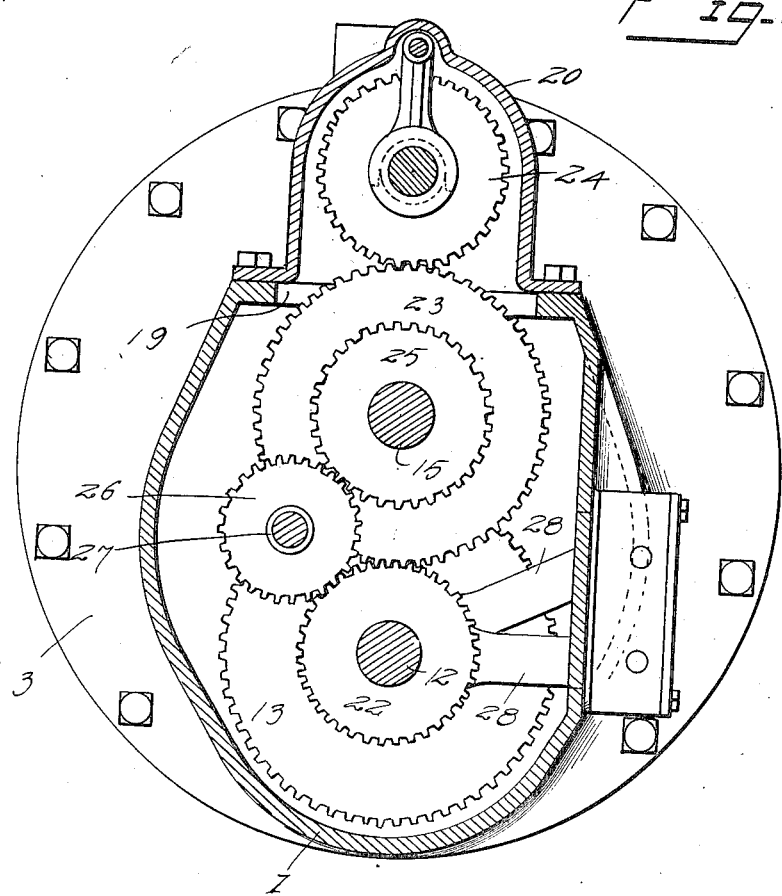
Figure 5:
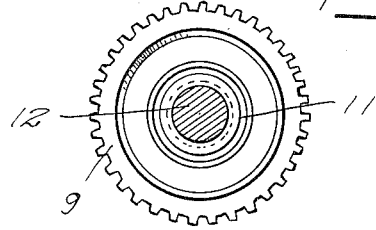

For a complete understanding of our invention, reference is to be had to the following description, and accompanying drawings, in which:

Figure 1 is a side elevation illustrating a transmission housing associated with clutch, differential and power take-off housings, Figure 2 is a vertical sectional view illustrating a transmission constructed in accordance with our invention and illustrating the same associated with a differential and power take-off, Figure 3 is a transverse sectional view taken on the line 3—3 of Figure 2, Figure 4 is a plan view, illustrating the transmission housing with the differential hanger formed integrally therewith and illustrating the opening in the top of the transmission housing by having the power take-off housing removed, Figure 5 is a plan view partly in section of one of the shifting gears.

Referring in detail to the drawings, the numeral 1 indicates a transmission housing which has its forward end secured to a clutch housing 1ª and its rear end secured to a differential housing 1ᵇ. The front end of the transmission housing is open and is closed by a rear wall 2 of the clutch housing which has bearing openings to receive forward transmission bearings 2ᵇ and 2ᶜ while the rear end of the transmission housing is provided with an integral rear wall 3 that closes the opening in the front of the differential housing 1ᵇ and is provided with bearing openings to receive rear transmission bearings 3ª and 3ᵇ that aline with the bearings 2ᵇ and 2ᶜ respectively. The rear wall 3 of the transmission housing 1 has formed integrally therewith a hanger 4 which extends into the differential housing 1 and supports a differential which includes a worm wheel 5 that meshes with a worm 6 on a worm shaft 7. The worm shaft 7 extends into a sleeve 8 journaled in the bearing 3ᵇ and which is formed integrally with a direct drive gear 9. The worm shaft 7 is splined in said sleeve 8 and said worm shaft has formed thereon a collar or flange 10 that abuts the end of the sleeve to limit the forward movement of said worm shaft. The gear 9 has located within the same, a bearing 11 which rotatably supports the inner end of a power shaft 12 which is journaled in the bearing 2c and disposed in horizontal alinement with the worm shaft 7. A shifting gear 13 is splined to the power shaft 12 adjacent its rear end and is provided with an internal clutch face 14 adapted to receive or engage the gear 9 when desiring to drive the worm shaft 7 directly or at the same rate of speed as the power shaft 12.

A counter shaft 15 is journaled in the bearings 2b and 3a and has secured to its rear end a gear 16 which is in continuous mesh with the gear 9 so that the counter shaft is only rotating during the movement of the tractor or motor vehicle. A comparatively small gear 17 is splined to the counter shaft 15 and spaced from the gear 16 by a spacing collar 18 and is adapted to to be engaged by the shifting gear 13 when in one of its positions to obtain high speed for the transmission.

The top wall of the transmission housing 1 is provided with an opening 19 over which is positioned a power take-off 20 that forms subject matter for a co-pending application. A comparatively large gear 21 is secured to the counter shaft adjacent the gear 17 and extends through the opening 19 and into the power take-off 20 and is adapted to be engaged by a shifting gear 22 splined to the power shaft 12 when it is desired to obtain low speed to the transmission. The shifting gear 22 is of considerable width and continuously meshes with an idle gear 23 journaled on the counter shaft 15 adjacent the gear 21 which is also of a considerable width so that when the shifting gear 22 is moved into mesh with the gear 21, said shifting gear still remains in mesh with the idle gear. The idle gear extends into the power take-off 20 and is adapted to be engaged by a shifting gear 24 of said power take-off for operating the same whenever desired, thus it will be seen that the idle gear is continuously driven by the power shaft 12 regardless of the position of the shifting gear 22.

A reversing pinion 25 is secured to the counter shaft 15 adjacent the idle gear 23 and is continuously in mesh with a pinion 26 journaled on a stub shaft 27 and which pinion is adapted to be engaged by the shifting gear 22 when desiring to obtain reverse to the transmission. It is also to be noted that when the shifting gear 22 moves into engagement with the pinion 26 that said shifting gear still remains in mesh with the idle gear 23.

The shifting gears 13 and 22 have connected thereto shifting forks 28 that are connected to a shifting mechanism 29 by rods 30 and which shifting mechanism forms subject matter for a co-pending application.

From the foregoing description taken in connection with the accompanying drawings, it will be noted that the counter shaft 15 is only in rotation during the movement of the tractor or vehicle and in some instances the changing of speed of a tractor or heavy motor vehicle only takes place while the vehicle or tractor is standing idle and by having the counter shaft 15 non-rotating at the time the vehicle or tractor is standing idle obviates as near as possible the necessity of shifting gears into spinning gears which increases the life of the gears.

When the tractor or motor vehicle is doing heavy draft work, the transmission is shifted so that a direct drive is obtained between the power shaft 12 and the worm shaft 8 by meshing the gears 9 and 13, also it is to be noted that the power is delivered to the differential in direct alinement with the worm 6 thereof which gives the tractor or like motor vehicle greater draft power over other known types and with a reduced amount of friction and back pressure.

It is further to be noted that all of the gears are confined in a single housing so that the lubricant usually placed within said housing will lubricate all of the gears and also the one housing will protect all of the gears from dirt and foreign matter. Further, it is to be noted that the shifting gear 22 is never out of mesh with the idle gear 23 thus obviating the shifting of this gear 22 into mesh with the idle gear.

While we have shown and described the preferred embodiment of our invention, it will be understood that minor changes in construction, combination, and arrangement of parts may be made without departing from the spirit and scope of the invention as claimed.

Having thus described our invention what we claim is:

1. A transmission including a housing and a power take-off, counter and power shafts in said housing, a driven shaft in direct alinement with the power shaft, a gear secured to the driven shaft, means connecting the counter shaft to said gear, a shifting gear on the power shaft, means establishing a direct drive between said gears, a low speed gear secured to the counter shaft and adapted to be engaged by the shifting gear to obtain low speed to the transmission, an idle gear journaled on the counter shaft, a shifting gear continuously in mesh with the idle gear, said idle gear adapted to drive the power take-off, reversing and low speed gears on the counter shaft and adapted to be engaged by the second named shifting gear without said second named shifting gear moving out of mesh with the idle gear.

2. A transmission including a housing and a power take-off with a shifting gear, counter and power shafts in said housing, a driven shaft in direct alinement with the power shaft, means establishing a direct drive between the power shaft and the driven shaft, means driving the driven shaft with the counter shaft, means driving the counter shaft at one rate of speed and in a reverse direction by said second named shifting gear, a low speed gear secured to the counter shaft, a third shifting gear secured to the power shaft and of a considerable width and adapted when in one position to mesh with the low speed gear, an idle gear journaled on the counter shaft and adapted to be engaged by the first named shifting gear and in continuous mesh with the third mentioned shifting gear, a reversing gear on the counter shaft, and a reversing pinion continuously in mesh with the reversing gear and adapted to be engaged by the third mentioned shifting gear without said gear coming out of mesh with the idle gear.

3. The combination with a driving element, a driven element, gears adapted to rotate said driven element at various speeds, a shifting gear rotated by the driving element and adapted to impart rotation to some of said gears, of an additional gear constantly in mesh with said shifting gear, a power take-off shaft, and means for connecting said shaft to and disconnecting it from said additional gear.

4. A transmission comprising a housing, a power take-off associated with said housing, a power shaft in said housing, a driven shaft in said housing, a counter-shaft in said housing, a driving connection between the driven and counter shafts, means for establishing a direct drive between the power and driven shafts, speed changing gears for the countershaft, an idle gear journaled on the countershaft, means for connecting the idle gear with the power take-off, and a shifting gear on the power shaft and in mesh with the idle gear when occupying any one of its positions.

5. In a transmission mechanism, a drive shaft, a driven shaft, a countershaft permanently geared to said driven shaft, means for connecting and disconnecting said drive shaft with said countershaft, a power take-off operating device, and means including an idle gear upon said counter-shaft for connecting said device with said drive shaft whereby said device may be operated with the countershaft idle.

6. In a transmission mechanism, power take-off mechanism, a drive shaft, a driven shaft, a countershaft permanently geared to the driven shaft, means for connecting and disconnecting said drive shaft with said countershaft, an idle gear on said countershaft, means for connecting said idle gear with said power take-off mechanism and means for driving said idle gear from said drive shaft.

7. In a transmission mechanism, power take-off mechanism, a drive shaft, a driven shaft, a countershaft permanently geared to the driven shaft, means for connecting and disconnecting said drive shaft with said countershaft, an idle gear on said countershaft, means for connecting said idle gear with said power take-off mechanism and a gear on said drive shaft permanently geared to said idle gear.

8. In a transmission mechanism, power take-off mechanism, a drive shaft, a driven shaft, a countershaft permanently geared to the driven shaft, a shiftable gear on said drive shaft to transmit motion to said countershaft, an idle gear on said countershaft with which said shiftable gear meshes, and means for connecting said idle gear with said power take-off mechanism.

9. In a transmission mechanism, power take-off mechanism, a drive shaft, a driven shaft, a countershaft permanently geared to said driven shaft and also having a plurality of change of speed gears, a pair of shiftable gears on said drive shaft, an idle gear on said counter-shaft, means for connecting said idle gear with said power take-off mechanism one of said shiftable gears being permanently in mesh with said idle gear, and means for directly connecting the other shiftable gear with said driven shaft.

In testimony whereof we affix our signatures in presence of two witnesses.

BENJAMIN C. ZUHARS.
HARRY D. CLARKE.

Witnesses:
JAMES F. LANGHEAD,
JOSEPH MARION.